United States Patent
Wang et al.

(10) Patent No.: US 9,875,118 B2
(45) Date of Patent: Jan. 23, 2018

(54) METHOD AND EMBEDDED DEVICE FOR LOADING DRIVER

(71) Applicant: Huawei Technologies Co., Ltd., Shenzhen, Guangdong (CN)

(72) Inventors: Daneng Wang, Hangzhou (CN); Guanghua Zhong, Shenzhen (CN); Fang Yuan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 14/856,195

(22) Filed: Sep. 16, 2015

(65) Prior Publication Data
US 2016/0004545 A1    Jan. 7, 2016

Related U.S. Application Data

(63) Continuation of application No. PCT/CN2014/090101, filed on Oct. 31, 2014.

(30) Foreign Application Priority Data

Apr. 30, 2014    (CN) .......................... 2014 1 0182979

(51) Int. Cl.
*G06F 3/00* (2006.01)
*G06F 9/44* (2006.01)
(Continued)

(52) U.S. Cl.
CPC ............ *G06F 9/44505* (2013.01); *G06F 8/41* (2013.01); *G06F 9/4411* (2013.01)

(58) Field of Classification Search
None
See application file for complete search history.

(56) References Cited

U.S. PATENT DOCUMENTS 5,136,709 A       8/1992   Shirakabe et al.
5,701,476 A  *   12/1997   Fenger .................. G06F 9/4411
                                                                    713/2
(Continued)

FOREIGN PATENT DOCUMENTS

CN         1609829 A       4/2005
CN       103677921 A       3/2014
(Continued)

OTHER PUBLICATIONS

"How Device Drivers Work", Microsoft TechNet, Mar. 28, 2003, 11 pages.
(Continued)

*Primary Examiner* — Tuan Dao
*Assistant Examiner* — William C Wood

(57) ABSTRACT

The invention discloses a method and a device for loading a driver, where the method includes: determining a model identifier corresponding to a component included in an embedded device, and searching for a driver associated with the model identifier; loading a found driver into a memory of the embedded device, and controlling the driver to drive the component. In this solution, when a driver is loaded onto a component onto which a driver is to be loaded, an associated driver is searched for according to a model identifier of the component onto which the driver is to be loaded, and then the associated driver may be loaded. A combination of drivers of multiple components does not need to be searched for, or a combination of identifiers corresponding to drivers of multiple components does not need to be generated. Therefore, consumed time is reduced and loading efficiency is improved.

17 Claims, 4 Drawing Sheets

(51) Int. Cl.
*G06F 9/46* (2006.01)
*G06F 13/00* (2006.01)
*G06F 9/445* (2006.01)
*G06F 9/45* (2006.01)

(56) References Cited

U.S. PATENT DOCUMENTS

| | | | |
|---|---|---|---|
| 9,110,679 B1* | 8/2015 | Chan | G06F 9/4411 |
| 2002/0161939 A1 | 10/2002 | Kim et al. | |
| 2002/0194398 A1 | 12/2002 | Bentley et al. | |
| 2004/0054945 A1* | 3/2004 | Smith | G06F 11/362 |
| | | | 714/38.11 |
| 2004/0153580 A1 | 8/2004 | Chen et al. | |
| 2007/0101342 A1 | 5/2007 | Flegg et al. | |
| 2008/0244566 A1* | 10/2008 | Fukaya | G06F 9/4411 |
| | | | 717/176 |
| 2011/0010532 A1* | 1/2011 | Li | G06F 9/4406 |
| | | | 713/2 |
| 2012/0054740 A1* | 3/2012 | Chakraborty | G06F 9/45558 |
| | | | 718/1 |
| 2012/0167044 A1* | 6/2012 | Fortier | G06F 9/455 |
| | | | 717/121 |
| 2013/0080993 A1* | 3/2013 | Stravers | G06F 8/35 |
| | | | 717/104 |
| 2013/0246721 A1* | 9/2013 | Fukutomi | G06F 3/0604 |
| | | | 711/155 |
| 2013/0263159 A1 | 10/2013 | Yamanaka et al. | |
| 2014/0040605 A1* | 2/2014 | Futral | G06F 9/445 |
| | | | 713/2 |

FOREIGN PATENT DOCUMENTS

| | | |
|---|---|---|
| CN | 103942078 A | 7/2014 |
| JP | 11-296375 A | 10/1999 |
| JP | 2007-299036 A | 11/2007 |
| JP | 2013-214122 A | 10/2013 |
| JP | 2014-006814 A | 1/2014 |
| WO | WO 2006/115612 A2 | 11/2006 |

OTHER PUBLICATIONS

Atsushi Kubota, "Let's read a source code of the device driver", Software Design, Gijutsu-Hyohron Co., Ltd., Jan. 18, 2010, Issue 231, 11 pages.

Atomu Hidaka, "Structure and development of the device driver of Linux Kernel 2.6", Interface, CQ Publishing Co., Ltd., vol. 31, Issue 7, Jul. 1, 2005, 30 pages.

Kraig Brockschmidt, "Ole Technology", Microsoft System Journal, Japanese edition, Ascii Corporation, Aug. 18, 1996, Issue 44, 21 pages.

* cited by examiner

METHOD AND EMBEDDED DEVICE FOR LOADING DRIVER

CROSS-REFERENCE TO RELATED APPLICATIONS

This application is a continuation of International Application No. PCT/CN2014/090101, filed on Oct. 31, 2014, which claims priority to Chinese Patent Application No. 201410182979.9, filed on Apr. 30, 2014, both of which are hereby incorporated by reference in their entireties.

TECHNICAL FIELD

The present invention relates to the field of computer technologies, and in particular, to a method and an embedded device for loading a driver.

BACKGROUND

With the rapid development of communications technologies, the computer field experiences a PC (Personal Computer, personal computer) era and a network era, and then faces a so-called post-PC era. As a newcomer in the PC era and a post-network era, an embedded device is increasingly important.

At present, increasingly more components are supported on embedded devices such as a smartphone and a wearable device, and each component can run only after a corresponding driver is loaded. A same component in embedded devices of a same model is usually provided by different manufacturers, and a driver corresponding to the same component provided by different manufacturers is also different. In a practical application, before delivery of each embedded device, a driver of each component on the embedded device needs to be loaded completely, so that a user that holds the embedded device can directly use the component.

In the prior art, before a driver is loaded, identifiers of drivers that may be used by components need to be combined first to obtain a driver identifier combination, and multiple driver identifier combinations are added to a registry. When loading a driver, an embedded device searches in the registry to determine a driver identifier combination corresponding to the embedded device, then searches for a corresponding driver according to driver identifiers of components included in the driver identifier combination, and then performs loading.

For example, an embedded device has two components: a gyroscope and a gravity sensor. The gyroscope is provided by two manufacturers, an identifier corresponding to a driver 1 of the gyroscope provided by a manufacturer 1 is an identifier 1, and an identifier corresponding to a driver 2 of the gyroscope provided by a manufacturer 2 is an identifier 2; the gravity sensor is also provided by two manufacturers, an identifier corresponding to a driver 3 of the gravity sensor provided by a manufacturer 3 is an identifier 3, and an identifier corresponding to a driver 4 of the gravity sensor provided by a manufacturer 4 is an identifier 4. Then, four driver identifier combinations need to be generated: a driver identifier combination 1: the identifier 1 and the identifier 3; a driver identifier combination 2: the identifier 1 and the identifier 4; a driver identifier combination 3: the identifier 2 and the identifier 3; and a driver identifier combination 4: the identifier 2 and the identifier 4. Each batch of embedded devices is corresponding to one driver identifier combination, and the corresponding driver identifier combination is determined after production is completed. Therefore, to load a driver, an embedded device needs to first search, in a registry, for a driver identifier combination corresponding to the batch of embedded devices from four driver identifier combinations, that is, a driver identifier combination 1, a driver identifier combination 2, a driver identifier combination 3, and a driver identifier combination 4, then searches for the driver according to driver identifiers included in the driver identifier combination, and then performs loading.

When an embedded device loads a driver, the embedded device is corresponding to a driver identifier combination; then, identifiers of drivers of components included in the corresponding driver identifier combination are found, and a driver corresponding to an identifier of the driver is loaded. With increase of components in the embedded device and diversity of manufacturers of each component, there are increasingly more driver identifier combinations. Therefore, there is a disadvantage of time consuming and low loading efficiency.

SUMMARY

Embodiments of the present invention provide a method and an apparatus for loading a driver, which are used to solve a problem of time consuming and low loading efficiency in the prior art.

The embodiments of the present invention provide the following specific technical solutions:

According to a first aspect, a method for loading a driver is provided, including:

determining a model identifier corresponding to a component included in an embedded device, where the component is a component onto which a driver is to be loaded;

searching for a driver associated with the model identifier corresponding to the component; and loading a found driver into a memory of the embedded device, and controlling the driver loaded into the memory of the embedded device to drive the component.

With reference to the first aspect, in a first possible implementation manner, the searching for a driver associated with the model identifier corresponding to the component specifically includes:

searching for, by using a minimum operating system mirror of the embedded device, the driver associated with the model identifier corresponding to the component, where the minimum operating system mirror is used to start the embedded device, run a service function, and load the driver of the component included in the embedded device.

With reference to the first possible implementation manner of the first aspect, in a second possible implementation manner, before the searching for a driver associated with the model identifier corresponding to the component, the method further includes:

generating the minimum operating system mirror of the embedded device.

With reference to the second possible implementation manner of the first aspect, in a third possible implementation manner, the generating the minimum operating system mirror of the embedded device includes:

compiling original code that is developed based on the service function of the embedded device, to generate an initial minimum operating system mirror, where the initial minimum operating system mirror includes an executable file and a file in an executable and linkable format, and the original code is used to implement the service function of the embedded device;

extracting a symbol table from the file in the executable and linkable format, where the file in the executable and linkable format is included in the initial minimum operating system mirror;

generating a C file according to the symbol table, and adding the generated C file to the original code; and compiling the original code to which the C file has been added, so as to obtain the minimum operating system mirror of the embedded device.

With reference to the first aspect, or the first to third possible implementation manners of the first aspect, in a fourth possible implementation manner, before the searching for a driver associated with the model identifier corresponding to the component, the method further includes:

determining respective model identifiers of components of a same type with the component and each driver corresponding to each of the components of the same type, where the components of the same type are components that have a same attribute or function with the component; and storing an association relationship between a determined model identifier of each component of the same type with the component and a determined driver of the component of the same type.

With reference to the fourth possible implementation manner of the first aspect, in a fifth possible implementation manner, the storing an association relationship between a determined model identifier of each component of the same type with the component and a determined driver of the component of the same type specifically includes:

compiling the driver of each component of the same type into a file in a preset format, where the file in the preset format has an attribute of relocation;

storing the file in the preset format according to a preset rule, and acquiring a logical address in which the file in the preset format is stored; and storing a correspondence between any one of the model identifiers and the acquired logical address.

With reference to the fifth possible implementation manner of the first aspect, in a sixth possible implementation manner, an address field of the file in the preset format is an initial preset value, and after the storing the file in the preset format according to a preset rule, the method further includes:

changing the initial preset value in the address field of the file in the preset format to the logical address.

With reference to the fifth or sixth possible implementation manner of the first aspect, in a seventh possible implementation manner, the searching for a driver associated with the model identifier corresponding to the component specifically includes:

determining, from the stored association relationship, a logical address that is corresponding to the model identifier corresponding to the component; and using a file in a preset format as the driver associated with the model identifier corresponding to the component, where the file in the preset format is stored in the determined logical address.

With reference to the sixth or seventh possible implementation manner of the first aspect, in an eighth possible implementation manner, the loading a found driver into a memory of the embedded device specifically includes:

determining a physical address of the driver loaded into the memory of the embedded device; and modifying an address field in the driver from a logical address to the physical address.

With reference to the first to eighth possible implementation manners of the first aspect, in a ninth possible implementation manner, the loading a found driver into a memory of the embedded device includes:

loading the found driver into the memory of the embedded device by using the minimum operating system mirror in a dynamic loading manner.

With reference to the ninth possible implementation manner of the first aspect, in a tenth possible implementation manner, the loading the found driver into the memory of the embedded device by using the minimum operating system mirror in a dynamic loading manner specifically includes:

copying the found driver into the memory of the embedded device by using a function and a global variable in the minimum operating system mirror; and based on the minimum operating system mirror and in a form of a function pointer, invoking an interface function in the found driver and linking the driver that is copied into the memory of the embedded device.

According to a second aspect, an embedded device for loading a driver is provided, including:

a determining unit, configured to determine a model identifier corresponding to a component included in the embedded device, where the component is a component onto which a driver is to be loaded;

a searching unit, configured to search for a driver associated with the model identifier corresponding to the component; and a loading unit, configured to load a found driver into a memory of the embedded device, and control the driver loaded into the memory of the embedded device to drive the component.

With reference to the second aspect, in a first possible implementation manner, the searching unit is specifically configured to:

search for, by using a minimum operating system mirror of the embedded device, the driver associated with the model identifier corresponding to the component, where the minimum operating system mirror is used to start the embedded device, run a service function, and load the driver of the component included in the embedded device.

With reference to the first possible implementation manner of the second aspect, in a second possible implementation manner, the embedded device further includes a generating unit, where the generating unit is configured to generate the minimum operating system mirror of the embedded device.

With reference to the second possible implementation manner of the second aspect, in a third possible implementation manner, the generating unit includes:

a compiling module, configured to compile original code that is developed based on the service function of the embedded device, to generate an initial minimum operating system mirror, where the initial minimum operating system mirror includes an executable file and a file in an executable and linkable format, and the original code is used to implement the service function of the embedded device; and an extracting module, configured to extract a symbol table from the file in the executable and linkable format, where the file in the executable and linkable format is included in the initial minimum operating system mirror; and generate a C file according to the symbol table, and add the generated C file to the original code; where the compiling module is further configured to compile the original code to which the C file has been added, so as to obtain the minimum operating system mirror of the embedded device.

With reference to the second aspect, or the first to third possible implementation manners of the second aspect, in a fourth possible implementation manner, the embedded device further includes a storage unit, where the storage unit is specifically configured to:

determine respective model identifiers of components of a same type with the component and each driver corresponding to each of the components of the same type, where the components of the same type are components that have a same attribute or function with the component; and store an association relationship between a determined model identifier of each component of the same type with the component and a determined driver of the component of the same type.

With reference to the fourth possible implementation manner of the second aspect, in a fifth possible implementation manner, the storage unit is specifically configured to:

compile the driver of each component of the same type into a file in a preset format, where the file in the preset format has an attribute of relocation; store the file in the preset format according to a preset rule, and acquire a logical address in which the file in the preset format is stored; and store a correspondence between any one of the model identifiers and the acquired logical address.

With reference to the fifth possible implementation manner of the second aspect, in a sixth possible implementation manner, an address field of the file in the preset format is an initial preset value, and the storage unit is further configured to:

change the initial preset value in the address field of the file in the preset format to the logical address after storing the file in the preset format according to the preset rule.

With reference to the fifth or sixth possible implementation manner of the second aspect, in a seventh possible implementation manner, the searching unit is specifically configured to:

determine, from the stored association relationship, a logical address that is corresponding to the model identifier corresponding to the component; and use a file in a preset format as the driver associated with the model identifier corresponding to the component, where the file in the preset format is stored in the determined logical address.

With reference to the sixth or seventh possible implementation manner of the second aspect, in an eighth possible implementation manner, the loading unit is specifically configured to:

determine a physical address of the driver loaded into the memory of the embedded device; and modify an address field in the driver from a logical address to the physical address.

With reference to the first to eighth possible implementation manners of the second aspect, in a ninth possible implementation manner, the loading unit is specifically configured to:

copy the found driver into the memory of the embedded device by using a function and a global variable in the minimum operating system mirror; and based on the minimum operating system mirror and in a form of a function pointer, invoke an interface function in the found driver and link the driver that is copied into the memory of the embedded device.

Beneficial effects of the present invention are as follows:

In the prior art, when a driver is loaded, an embedded device searches, in a registry, for a driver identifier combination corresponding to the embedded device, and then searches for, according to driver identifiers included in the driver identifier combination, a driver corresponding to each driver identifier. There are increasingly more driver identifier combinations, and therefore, there is a disadvantage of time consuming and low loading efficiency. In the embodiments of the present invention, a model identifier currently corresponding to a component included in an embedded device is determined, where the component is a component onto which a driver is to be loaded; a driver associated with the model identifier corresponding to the component is searched for; and a found driver is loaded into a memory of the embedded device, and the driver linked into the memory of the embedded device is controlled to drive the component. In this solution, when a driver is loaded onto a component onto which a driver is to be loaded, an associated driver is searched for according to a model identifier of the component onto which the driver is to be loaded, and then the associated driver may be loaded. multiple driver identifier combinations do not need to be generated, or multiple driver identifier combinations do not need to be searched for. Therefore, consumed time is reduced and loading efficiency is improved.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The term "and/or" in this specification describes only an association relationship of associated objects and represents that three relationships may exist. For example, A and/or B may represent the following three cases: Only A exists, both A and B exist, and only B exists. In addition, the character "/" in this specification generally indicates an "or" relationship between the associated objects.

In a practical application, one embedded device generally includes multiple components, such as a display, a sensor, a processor, and a camera; before each component runs, a driver needs to be loaded. Therefore, in an embodiment of the present invention, a method for loading a driver is provided. In the method, a model identifier corresponding to a component included in an embedded device is determined, where the component is a component onto which a driver is to be loaded; a driver associated with the model identifier corresponding to the component is searched for; and a found driver is loaded into a memory of the embedded device, and the driver loaded into the memory of the embedded device is controlled to drive the component. In this solution, when a driver is loaded onto a component onto which a driver is to be loaded, an associated driver is searched for according to a model identifier of the component onto which the driver is to be loaded, and then the associated driver may be loaded. A combination of drivers of multiple components does not need to be searched for, or a combination of identifiers corresponding to drivers of multiple components does not need to be generated. Therefore, consumed time is reduced and loading efficiency is improved.

Exemplary implementation manners of the present invention are described in detail in the following with reference to the accompanying drawings.

Figure 1A:
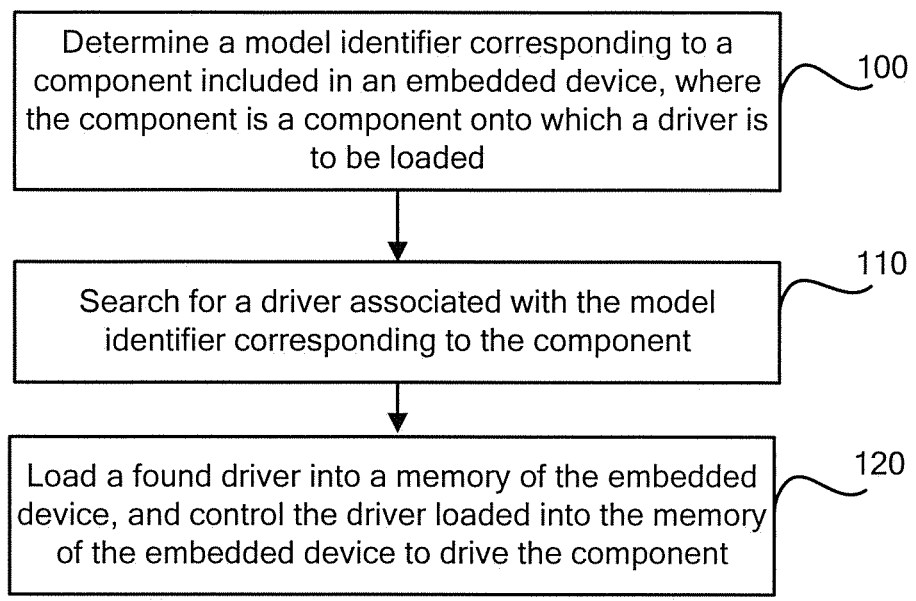
FIG. 1A is a flowchart of loading a driver according to an embodiment of the present invention.

Referring to FIG. 1A, an embodiment of the present invention provides a method for loading a driver, where a specific process of the method is as follows:

Step 100: Determine a model identifier corresponding to a component included in an embedded device, where the component is a component onto which a driver is to be loaded.

Step 110: Search for a driver associated with the model identifier corresponding to the component.

Step 120: Load a found driver into a memory of the embedded device, and control the driver loaded into the memory of the embedded device to drive the component.

In this embodiment of the present invention, there are many triggering conditions for the method of step 100 to step 120; for example, when an instruction for loading a driver is received, the process begins. Certainly, in a practical application, there may be other triggering conditions, and details are not described herein.

In this embodiment of the present invention, there are many received instructions for loading a driver; for example, an instruction for initializing an embedded device may be used as an instruction for loading a driver; for another example, when it is detected that a peripheral device is inserted into an embedded device, detection information may be used as an instruction for loading a driver. Certainly, in a practical application, there are many other forms, and details are not described herein.

In this embodiment of the present invention, a model identifier is used to uniquely identify components of a same type produced by a manufacturer, and components of a same type produced by different manufacturers are distinguished by different model identifiers. That is, a model identifier is used to represent that a particular component is produced by a particular manufacturer; for example, a model identifier 1: A10376BZH is used to represent that a gyroscope is produced by a manufacturer XX; and a model identifier 2: B10376ASD is used to represent that a gravity sensor is produced by a manufacturer LLL. Generally, the first two bits of a model identifier is used to identify a component, the last three bits of the model identifier is used to indicate a manufacturer, and other bits of the model identifier may identify a production batch of the component, and the like, which may vary with different application scenarios, and details are not described herein. Similarly, a model identifier may also vary with different application scenarios, and details are not described herein.

In this embodiment of the present invention, there are many manners for searching for a driver associated with a model identifier corresponding to a component, and optionally, the following manner may be used:

The driver associated with the model identifier corresponding to the component is searched for by using a minimum operating system mirror of the embedded device, where the minimum operating system mirror is used to start the embedded device, run a service function, and load the driver of the component included in the embedded device. The minimum operating system mirror includes only a BSP (Board Support Package, board support package), an operating system, and application layer software.

It should be noted that, an operating system mirror in the prior art generally includes a BSP, an operating system, and application layer software, and in addition, further includes a driver of a component. Therefore, in the prior art, loading of a driver of a component only refers to initialization of the driver. In this embodiment of the present invention, however, a minimum operating system mirror includes only a BSP, an operating system, and application layer software; therefore, a driver needs to be loaded into a memory of an embedded device first, and then the driver is initialized. Compared with functions of the operating system mirror in the prior art, functions of the minimum operating system mirror in this embodiment of the present invention have one more driver loading function.

Certainly, in a practical application, searching for the driver associated with the model identifier corresponding to the component may also be implemented in another manner, and details are not described herein.

In this case, before the driver associated with the model identifier corresponding to the component is searched for, the following operation is further included:

generating the minimum operating system mirror of the embedded device.

Figure 1B:
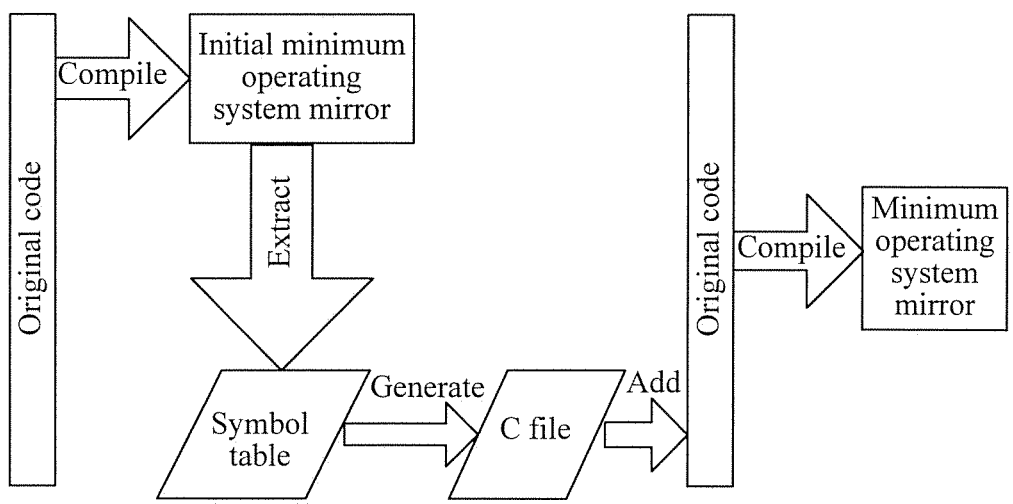
FIG. 1B is a schematic diagram of generating a minimum operating system mirror according to an embodiment of the present invention.

In this embodiment of the present invention, generating the minimum operating system mirror of the embedded device needs to be implemented by means of twice compilation. Specifically, the following manner shown in FIG. 1B may be used:

compiling original code that is developed based on the service function of the embedded device, to generate an initial minimum operating system mirror, where the initial minimum operating system mirror includes an executable file and a file in an executable and linkable format, and the original code is used to implement the service function of the embedded device;

extracting a symbol table from the file in the executable and linkable format, where the file in the executable and linkable format is included in the initial minimum operating system mirror;

generating the symbol table into a C file, and adding the generated C file to the original code; and compiling the original code to which the C file has been added, so as to obtain the minimum operating system mirror of the embedded device.

In this embodiment of the present invention, in order to make an executive address of a function and a global variable that are included in the minimum operating system mirror that is obtained after second compilation exactly match a symbol table address, which is generated by means of first compilation, in the minimum operating system mirror, two segment spaces are newly added to an end portion, which is obtained by means of division, of a link script segment in a second compilation process, and are used to store data and a character string that are generated in the symbol table.

In a practical application, before a driver associated with a model identifier corresponding to a component is searched for, a driver associated with a model identifier corresponding to a component onto which a driver is to be loaded needs to be stored first. Therefore, in this embodiment of the present invention, before the driver associated with the model identifier corresponding to the component is searched for, the following operations are further included:

determining respective model identifiers of components of a same type with the component and each driver corresponding to each of the components of the same type, where the components of the same type are components that have a same attribute or function with the component; and storing an association relationship between a determined model identifier of each component of the same type with the component and a determined driver of the component of the same type.

In this embodiment of the present invention, the components of the same type may be in many forms, for example, may be components that have a same function or attribute and produced by different manufacturers. For example, for display screens separately produced by manufacturers A, B, and C, the display screens separately produced by the three manufacturers are components of a same type; alternatively, for gravity sensors separately produced by manufacturers A, B and C, the gravity sensors separately produced by the three manufacturers are components of a same type. For another example, the components of the same type may also be components that have a same function or attribute and produced by a same manufacturer in a different batch or version, for example, for 500 W pixel cameras and 800 W pixel cameras produced by manufacturer A, the two types of cameras are also components of a same type.

For example, display screens S are produced by three manufacturers, where a model identifier corresponding to a display screen S from manufacturer A is a model identifier 1 and is corresponding to a driver 1; a model identifier corresponding to a display screen S from manufacturer B is a model identifier 2 and is corresponding to a driver 2; and a model identifier corresponding to a display screen S from manufacturer C is a model identifier 3 and is corresponding to a driver 3. The display screens S are corresponding to three model identifiers, and each model identifier is corresponding to one driver. And, three association relationships are recorded for the display screens S: a first association relationship: an association relationship between the model identifier 1 and the driver 1; a second association relationship: an association relationship between the model identifier 2 and the driver 2; and a three association relationship: an association relationship between the model identifier 3 and the driver 3.

In this embodiment of the present invention, there are many manners for storing the association relationship between the determined model identifier of each component of the same type with the component and the determined driver of the component of the same type, and optionally, the following manner may be used:

compiling the driver of each component of the same type into a file in a preset format, where the file in the preset format has an attribute of relocation;

storing the file in the preset format according to a preset rule, and acquiring a logical address in which the file in the preset format is stored; and storing a correspondence between any one of the model identifiers and the acquired logical address.

In this embodiment of the present invention, there are many files in preset formats; and optionally, a file in a preset format may be a file in an ELF (Executable and Linkable Format, executable and linkable format). In this case, a suffix of the file in the preset format is .o. Certainly, in a practical application, as an application scenario varies, a file in a preset format may also be in another form, and details are not described herein.

In this embodiment of the present invention, there are many manners for compiling the driver of each component of the same type into a file in a preset format. Each file whose suffix is .c and included in the driver is compiled into a file in a preset format by using a compilation command, and then all compiled files in preset formats are linked into one file in the preset format by using a link command, where the file in the preset format may be an ELF file.

Figure 1C:
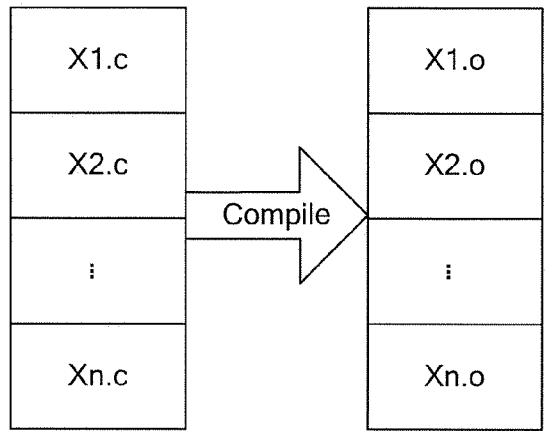
FIG. 1C is a schematic diagram of compiling a driver into a file in a preset format according to an embodiment of the present invention.

As shown in FIG. 1C, n files are included in one driver, a suffix of each file is .c before each file is stored. Each file whose suffix is .c in the driver is first compiled into a file whose suffix is .o by using a compilation command, and then all compiled files whose suffix is .o are linked into one ELF file whose suffix is .o by using a link command, where the ELF file has an attribute of relocation.

In this embodiment of the present invention, the file in the preset format may be stored according to a preset rule in the following manner. For example, a driver and a layout description are packaged by using a packaging tool image-build to generate a large mirror, and then the generated large mirror is fused into a Flash. Certainly, a minimum operating system mirror, a driver, and a layout description may be packaged to generate a large mirror, and in this case, a data storage structure description format of the large mirror that includes the minimum operating system mirror, the driver, and the layout description is shown in Table 1.

TABLE 1

| Data storage structure description of a large mirror | | | | |
|---|---|---|---|---|
| Data Segment Type | Type Identifier | Starting Address | Length (byte) | Remarks |
| Minimum operating system mirror | | 0 | SENSORHUB_IMAGE_LENGTH (100K) | The length is fixed. |
| Layout description | 2 | SHP_DATA_START(100K) | Variable length | The number of included files and metadata of each file are described. The length is a variable length. |
| Driver | 3 | | Variable length | The length is provisional. The length is a variable length. |

In the foregoing process, a rule set by the preset rule is included in the layout description, that is, a form set by the preset rule may be obtained from the layout description.

In this embodiment of the present invention, the preset rule may be in many forms, for example, manners such as consecutive storage and intermittent storage. Certainly, there is another manner, and details are not described herein.

In this embodiment of the present invention, a data structure of the layout description is as follows:

```
    typedef struct
    {
        uint32_t file_count;
        sh_file_node_t file_list[ ];
    }sh_section_desc_t;
    sh_file_node_t structure:
    typedef struct
    {
        uint32_t file_id;//number, increase from 1 in sequence, not
repeated
        uint32_t file_size;
        uint32_t file_offset;//offset value relative to a starting
address SECTION_DATA_START of segment data
        uint8_tfile_type;//1: driver, 2: algorithm, 3: others
        uint8_tfile_branch;//branch
        uint8_tfile_model;//component model identifier
        uint8_tdyn_pol;///camp/management policy, 0: automatic, 1:
permanent, and another value is defined later according to a
requirement
        uint8_tdyn_module_or_device_tag_list
        [SH_FILE_TAG_LIST];
        charfile_vendor[SH_FILE_VENDOR_LEN];//provider
        //a definition of this tag keeps consistent with that of a
tag in a packet, and one module can support eight tags at most
        charfile_name[SH_FILE_NAME_LEN];
        uint32_t  file_crc;//cyclic redundancy check code
    }sh_file_node_t;
```

When a driver is stored, a large mirror is generated and programmed into a Flash. In this case, the correspondence between any one of the model identifiers and the acquired logical address is stored in the layout description.

In this embodiment of the present invention, an address field of the file in the preset format is an initial preset value, and after the file in the preset format is stored according to the preset rule, the method further includes:

changing the initial preset value in the address field of the file in the preset format to the logical address.

In this embodiment of the present invention, there are many manners for searching for the driver associated with the model identifier corresponding to the component, and optionally, the following manner may be used:

determining, from the stored association relationship, a logical address that is corresponding to the model identifier corresponding to the component; and using a file in a preset format as the driver associated with the model identifier corresponding to the component, where the file in the preset format is stored in the determined logical address.

For example, the logical address that is corresponding to the model identifier corresponding to the component is searched for from the correspondence that is stored in the layout description of the Flash, and the file in the preset format that is stored in the determined logical address is used as the driver associated with the model identifier corresponding to the component.

In this embodiment of the present invention, there are many manners for loading the found driver into the memory of the embedded device, and optionally, the following manner may be used:

determining a physical address of the driver loaded into the memory of the embedded device; and modifying an address field in the driver from a logical address to the physical address.

In this embodiment of the present invention, there are many manners for loading the found driver into the memory of the embedded device, and optionally, the following manner may be used:

loading the found driver into the memory of the embedded device by using the minimum operating system mirror in a dynamic loading manner.

Certainly, in a practical application, there is another implementation manner, and details are not described herein.

In this embodiment of the present invention, there are many manners for loading the found driver into the memory of the embedded device by using the minimum operating system mirror in the dynamic loading manner, and optionally, the following manners may be used:

copying the found driver into the memory of the embedded device by using a function and a global variable in the minimum operating system mirror, where this manner is called a positive dependence manner; and then based on the minimum operating system mirror and in a form of a function pointer, invoking an interface function in the found driver and linking the driver that is copied into the memory of the embedded device, where this manner is called a negative dependence manner.

Figure 1D:
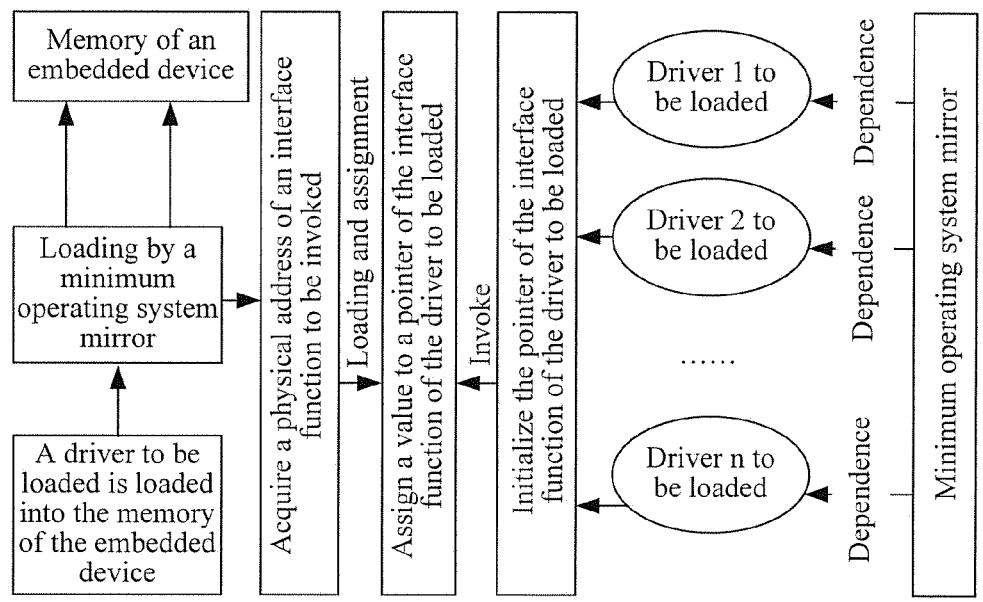
FIG. 1D is a schematic diagram of implementation of loading according to an embodiment of the present invention.

During specific implementation, the following steps shown in FIG. 1D may be used:

Step 1: The minimum operating system mirror initializes, according to the driver to be loaded, a pointer of an interface function to be invoked, that is, assigns a logical address to the interface function.

However, after the logical address is assigned, the interface function still cannot be invoked.

Step 2: The minimum operating system mirror parses defined and undefined symbols in the driver to be loaded, adds a symbol obtained by means of the parsing to a symbol table of the minimum operating system mirror, and updates the symbol table, and then, acquires, from the updated symbol table, a physical address of the interface function to be invoked.

Step 3: Assign, according to the physical address, a value to the pointer of the interface function to be invoked, that is, modify the logical address of the interface function to be invoked to the physical address.

In a practical application, some memories of the embedded device greatly affect the device; for example, more resources stored in the memory leads to lower operating efficiency of the embedded device. Therefore, in order to prevent the operating efficiency of the embedded device from being greatly affected after the driver is loaded, in this embodiment of the present invention, scatter loading is supported when the driver is loaded; drivers of some components that are important or are used frequently are loaded into a memory with a higher priority, and drivers of some components that are less important or are used less frequently are loaded into a memory with a lower priority, instead of loading drivers of all components into a core memory, thereby preventing the operating efficiency of the embedded device from being greatly affected after the driver is loaded.

For example, in a case in which SRAM (Static Random Access Memory, static random access memory) space is insufficient, an initialized driver and a driver that is used less frequently are loaded into a DDR (Double Data Rate, double data rate) synchronous dynamic random access memory.

In a specific implementation process, the following manner may be used:

By using a link script, a segment attribute may be configured for data and a function of the driver to be loaded. In a dynamic loading process, the segment attribute configured for the data and the function of the driver to be loaded is analyzed, and then the driver to be loaded is loaded in a scatter manner into a DDR memory or an SRAM memory.

Loading mentioned in this embodiment of the present invention includes at least two meanings. One meaning refers to an operation of copying a driver into a memory of an embedded device, and the other meaning refers to an operation of linking the driver that is copied into the memory of the embedded device. Certainly, in a practical application, the meanings of loading may also vary with different specific application scenarios, and details are not described herein.

Figure 2:
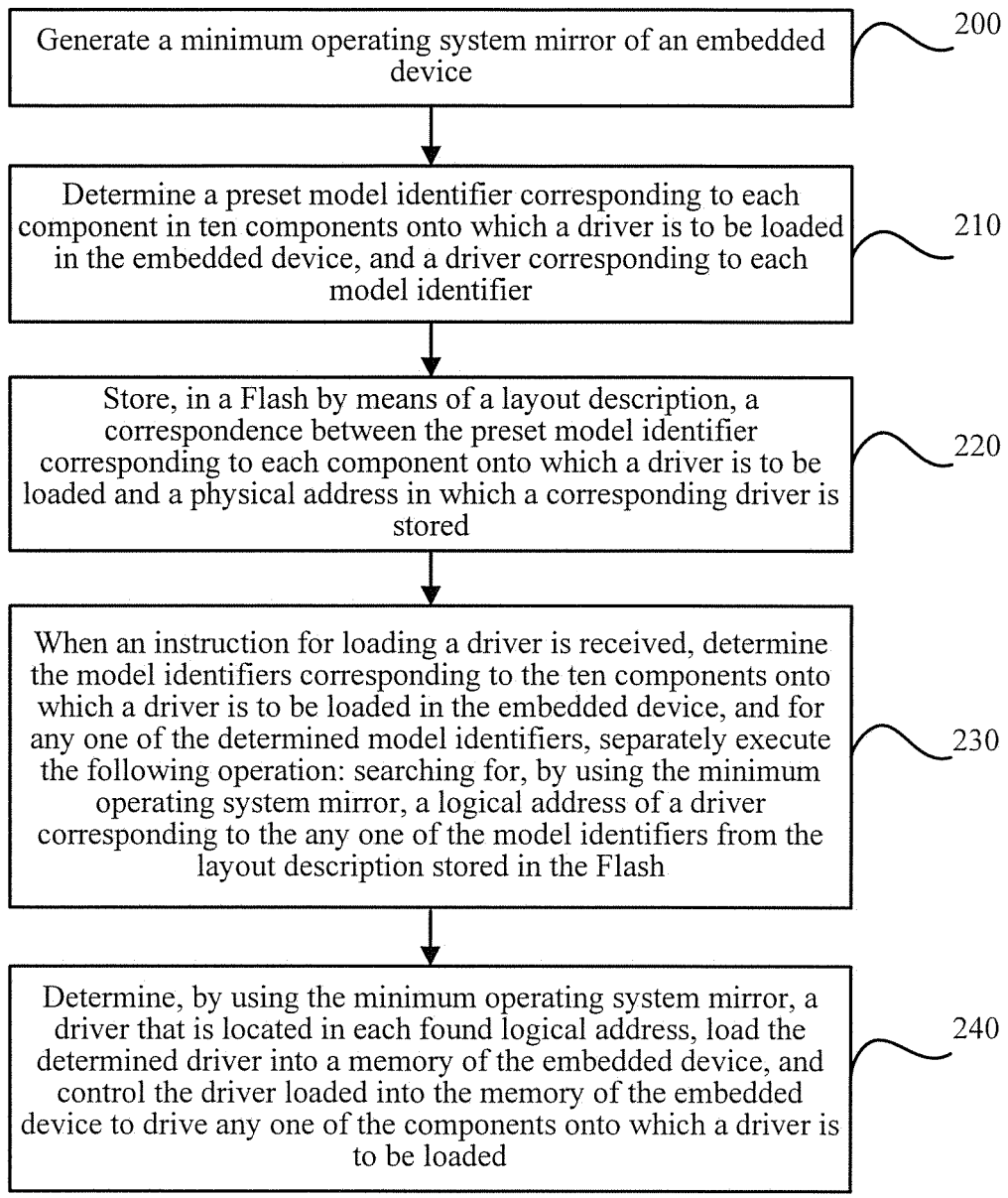
FIG. 2 is an flowchart of loading a driver according to an embodiment of the present invention.

To better understand this embodiment of the present invention, the following provides a specific application scenario and makes a further detailed description about a process of loading a driver, as shown in FIG. 2:

Step 200: Generate a minimum operating system mirror of an embedded device.

Step 210: Determine a preset model identifier corresponding to each component in ten components onto which a driver is to be loaded in the embedded device, and a driver corresponding to each model identifier.

Step 220: Store, in a Flash by means of a layout description, a correspondence between the preset model identifier corresponding to each component onto which a driver is to be loaded and a physical address in which the corresponding driver is stored. Step 230: When an instruction for loading a driver is received, determine the model identifiers corresponding to the ten components onto which a driver is to be loaded in the embedded device, and for any one of the determined model identifiers, separately execute the following operation: searching for, by using the minimum operating system mirror, a logical address of a driver corresponding to the any one of the model identifiers from the layout description stored in the Flash.

Step 240: Determine, by using the minimum operating system mirror, a driver that is located in each found logical address, load the determined driver into a memory of the embedded device, and control the driver loaded into the memory of the embedded device to drive any one of the components onto which a driver is to be loaded.

Figure 3:
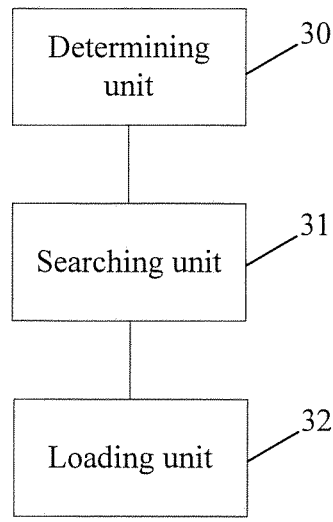
FIG. 3 is a schematic structural diagram of an function of an embedded device according to an embodiment of the present invention.

Based on the foregoing technical solution, referring to FIG. 3, an embodiment of the present invention correspondingly provides an embedded device for loading a driver, where the embedded device includes a determining unit 30, a searching unit 31, and a loading unit 32, where:

the determining unit 30 is configured to determine a model identifier corresponding to a component included in the embedded device, where the component is a component onto which a driver is to be loaded;

the searching unit 31 is configured to search for a driver associated with the model identifier corresponding to the component; and the loading unit 32 is configured to load a found driver into a memory of the embedded device, and control the driver loaded into the memory of the embedded device to drive the component.

In this embodiment of the present invention, optionally, the searching unit 31 is specifically configured to:

search for, by using a minimum operating system mirror of the embedded device, the driver associated with the model identifier corresponding to the component, where the minimum operating system mirror is used to start the embedded device, run a service function, and load the driver of the component included in the embedded device, where specifically, the minimum operating system mirror may include only a BSP, an operating system, and application layer software.

In this embodiment of the present invention, a generating unit 33 is further included, and the generating unit 33 is configured to generate the minimum operating system mirror of the embedded device.

In this embodiment of the present invention, optionally, the generating unit 33 includes:

a compiling module, configured to compile original code that is developed based on the service function of the embedded device, to generate an initial minimum operating system mirror, where the initial minimum operating system mirror includes an executable file and a file in an executable and linkable format, and the original code is used to implement the service function of the embedded device; and an extracting module, configured to extract a symbol table from the file in the executable and linkable format, where the file in the executable and linkable format is included in the initial minimum operating system mirror; and generate the symbol table into a C file, and add the generated C file to the original code; where the compiling module is further configured to compile the original code to which the C file has been added, so as to obtain the minimum operating system mirror of the embedded device.

In this embodiment of the present invention, a storage unit 34 is further included, and the storage unit 34 is specifically configured to:

determine respective model identifiers of components of a same type with the component and drivers corresponding to the components of the same type, where the components of the same type are components that have a same attribute or function with the component; and store an association relationship between a determined model identifier of each component of the same type with the component and a determined driver of the component of the same type.

In this embodiment of the present invention, optionally, that the storage unit 34 stores the association relationship between the determined model identifier of each component of the same type with the component and the determined driver of the component of the same type is specifically:

compiling the driver of each component of the same type into a file in a preset format, where the file in the preset format has an attribute of relocation;

storing the file in the preset format according to a preset rule, and acquiring a logical address in which the file in the preset format is stored; and storing a correspondence between any one of the model identifiers and the acquired logical address.

In this embodiment of the present invention, further, the storage unit 34 is further configured to:

change an initial preset value in an address field of the file in the preset format to the logical address, where the address field of the file in the preset format is the initial preset value.

In this embodiment of the present invention, optionally, the searching unit 31 is specifically configured to:

determine, from the stored association relationship, a logical address that is corresponding to the model identifier corresponding to the component; and use a file in a preset format as the driver associated with the model identifier corresponding to the component, where the file in the preset format is stored in the determined logical address.

In this embodiment of the present invention, optionally, the loading unit 32 is specifically configured to:

determine a physical address of the driver loaded into the memory of the embedded device; and modify an address field in the driver from a logical address to the physical address.

In this embodiment of the present invention, optionally, the loading unit 32 is specifically configured to:

load the found driver into the memory of the embedded device by using the minimum operating system mirror in a dynamic loading manner.

In this embodiment of the present invention, optionally, that the loading unit 32 loads the found driver into the memory of the embedded device by using the minimum operating system mirror in the dynamic loading manner is specifically:

copying the found driver into the memory of the embedded device by using a function and a global variable in the minimum operating system mirror; and based on the minimum operating system mirror and in a form of a function pointer, invoking an interface function in the found driver and linking the driver that is copied into the memory of the embedded device.

Figure 4:
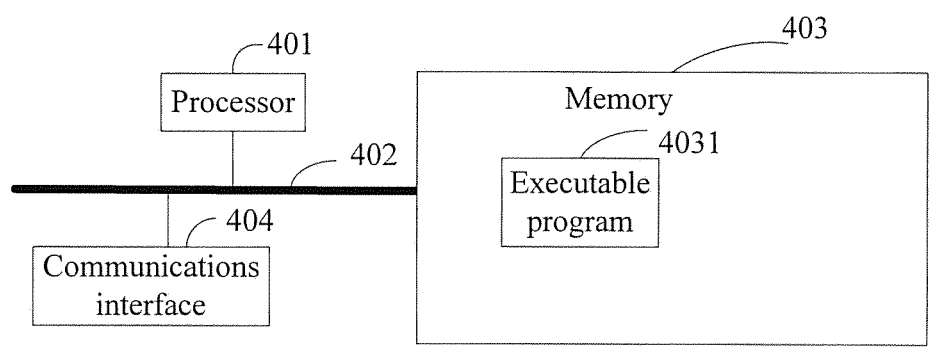
FIG. 4 is a schematic structural diagram of a physical apparatus of an embedded device according to an embodiment of the present invention.

As shown in FIG. 4, FIG. 4 is a structural diagram of a physical apparatus of an embedded device according to an embodiment of the present invention, where the embedded device includes at least one processor 401, a communications bus 402, a memory 403, and at least one communications interface 404.

The communications bus 402 is configured to implement connection and communication between the foregoing components, and the communications interface 404 is configured to implement connection and communication with an external device.

The memory 403 is configured to store executable program code 4031. By executing the program code 4031, the processor 401 is configured to:

determine a model identifier corresponding to a component included in the embedded device, where the component is a component onto which a driver is to be loaded;

search for a driver associated with the model identifier corresponding to the component; and load a found driver into a memory of the embedded device, and control the driver loaded into the memory of the embedded device to drive the component.

Optionally, the processor 401 may further be configured to implement another step and function in the foregoing embodiments by specifying the executable code in the memory 403, and details are not described herein.

In conclusion, in an embodiment of the present invention, a method for loading a driver is provided. In the method, a model identifier corresponding to a component included in an embedded device is determined, where the component is a component onto which a driver is to be loaded; a driver associated with the model identifier corresponding to the component is searched for; and a found driver is loaded into a memory of the embedded device, and the driver loaded into the memory of the embedded device is controlled to drive the component. In this solution, when a driver is loaded onto a component onto which a driver is to be loaded, an associated driver is searched for according to a model identifier of the component onto which the driver is to be loaded, and then the associated driver may be loaded. A combination of drivers of multiple components does not need to be searched for, or a combination of identifiers corresponding to drivers of multiple components does not need to be generated. Therefore, consumed time is reduced and loading efficiency is improved.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that an apparatus for implementing a function in one or more processes in the flowcharts and/or in one or more blocks in the block diagrams is generated by using instructions executed by a computer or a processor of any other programmable data processing device.

These computer program instructions may also be stored in a computer readable memory that can instruct the computer or any other programmable data processing device to work in a specific manner, so that the instructions stored in the computer readable memory generate a product that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are executed on the computer or the another programmable device, to generate computer-implemented processing. Therefore, the instructions executed on the computer or another programmable device provide steps for implementing a function in one or more processes in the flowcharts and/or in one or more blocks in the block diagrams.

Although exemplary embodiments of the present invention have been described, persons skilled in the art can make changes and modifications to these embodiments once they learn the basic inventive concept. Therefore, the appended claims are intended to be construed as to cover the exemplary embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations to the embodiments of the present invention provided that these modifications and variations fall within the protection scope of the appended claims and their equivalent technologies.

What is claimed is:

1. A method for loading a driver, the method comprising:

determining a model identifier corresponding to a component comprised in an embedded device, wherein the component is a component onto which a driver is to be loaded;

compiling original code that is developed based on a service function of the embedded device, to generate an initial minimum operating system mirror, wherein the initial minimum operating system mirror comprises a file in an executable and linkable format, and the original code is used to implement the service function of the embedded device;

extracting a symbol table from the file in the executable and linkable format, wherein the file in the executable and linkable format is comprised in the initial minimum operating system mirror;

generating a source file according to the symbol table, and adding the generated source file to the original code;

compiling the original code to which the source file has been added, so as to obtain a minimum operating system mirror of the embedded device;

searching for, by using a minimum operating system mirror of the embedded device, a driver associated with the model identifier corresponding to the component; starting the embedded device and running the service function by using the minimum operating system mirror; and loading a found driver into a memory of the embedded device by using the minimum operating system mirror.

2. The method according to claim 1, wherein before searching for a driver associated with the model identifier corresponding to the component, the method further comprises:

determining respective model identifiers of components of a same type with the component and each driver corresponding to each of the components of the same type, wherein the components of the same type are components that have a same attribute or function with the component; and storing an association relationship between a determined model identifier of each component of the same type with the component and a determined driver of the component of the same type.

3. The method according to claim 2, wherein storing an association relationship between a determined model identifier of each component of the same type with the component and a determined driver of the component of the same type comprises:

compiling the driver of each component of the same type into a file in a preset format, wherein the file in the preset format has an attribute of relocation;

storing the file in the preset format according to a preset rule, and acquiring a logical address in which the file in the preset format is stored; and storing a correspondence between any one of the model identifiers and the acquired logical address.

4. The method according to claim 3, wherein an address field of the file in the preset format is an initial preset value, and after storing the file in the preset format according to a preset rule, the method further comprises:

changing the initial preset value in the address field of the file in the preset format to the logical address.

5. The method according to claim 3, wherein searching for a driver associated with the model identifier corresponding to the component comprises:

determining, from the stored association relationship, a logical address that corresponds to the model identifier corresponding to the component; and using a file in a preset format as the driver associated with the model identifier corresponding to the component, wherein the file in the preset format is stored in the determined logical address.

6. The method according to claim 4, wherein loading a found driver into a memory of the embedded device comprises:

determining a physical address of the driver loaded into the memory of the embedded device; and modifying an address field in the driver from a logical address to the physical address.

7. The method according to claim 1, wherein loading a found driver into a memory of the embedded device comprises:

loading the found driver into the memory of the embedded device by using the minimum operating system mirror in a dynamic loading manner.

8. The method according to claim 7, wherein loading the found driver into the memory of the embedded device by using the minimum operating system mirror in a dynamic loading manner comprises:

copying the found driver into the memory of the embedded device by using a function and a global variable in the minimum operating system mirror; and based on the minimum operating system mirror and in a form of a function pointer, invoking an interface function in the found driver and linking the driver that is copied into the memory of the embedded device.

9. The method according to claim 1, further comprising:

controlling the driver loaded into the memory of the embedded device to drive the component.

10. An embedded device for loading a driver, the device comprising:

at least one processor configured to:

determine a model identifier corresponding to a component comprised in the embedded device, wherein the component is a component onto which a driver is to be loaded;

compile original code that is developed based on a service function of the embedded device, to generate an initial minimum operating system mirror, wherein the initial minimum operating system mirror comprises a file in an executable and linkable format, and the original code is used to implement the service function of the embedded device;

extract a symbol table from the file in the executable and linkable format, wherein the file in the executable and linkable format is comprised in the initial minimum operating system mirror;

generate a source file according to the symbol table, and add the generated source file to the original code;

compile the original code to which the source file has been added, so as to obtain a minimum operating system mirror of the embedded device;

search for, by using a minimum operating system mirror of the embedded device, a driver associated with the model identifier corresponding to the component;

start the embedded device and run the service function by using the minimum operating system mirror; and load a found driver into a memory of the embedded device by using the minimum operating system mirror.

11. The embedded device according to claim 10, wherein the at least one processor is further configured to:

determine respective model identifiers of components of a same type with the component and each driver corresponding to each of the components of the same type, wherein the components of the same type are components that have a same attribute or function with the component; and store an association relationship between a determined model identifier of each component of the same type with the component and a determined driver of the component of the same type.

12. The embedded device according to claim 11, wherein the at least one processor is further configured to:

compile the driver of each component of the same type into a file in a preset format, wherein the file in the preset format has an attribute of relocation;

store the file in the preset format according to a preset rule, and acquire a logical address in which the file in the preset format is stored; and store a correspondence between any one of the model identifiers and the acquired logical address.

13. The embedded device according to claim 12, wherein:
an address field of the file in the preset format is an initial preset value; and
the at least one processor is further configured to:
change the initial preset value in the address field of the file in the preset format to the logical address after storing the file in the preset format according to the preset rule.

14. The embedded device according to claim 12, wherein the at least one processor is further configured to:
determine, from the stored association relationship, a logical address that corresponds to the model identifier corresponding to the component; and
use a file in a preset format as the driver associated with the model identifier corresponding to the component, wherein the file in the preset format is stored in the determined logical address.

15. The embedded device according to claim 13, wherein the at least one processor is further configured to:
determine a physical address of the driver loaded into the memory of the embedded device, and modify an address field in the driver from a logical address to the physical address.

16. The embedded device according to claim 10, wherein the at least one processor is further configured to:
copy the found driver into the memory of the embedded device by using a function and a global variable in the minimum operating system mirror; and
based on the minimum operating system mirror and in a form of a function pointer, invoke an interface function in the found driver and link the driver that is copied into the memory of the embedded device.

17. The embedded device according to claim 10, wherein the at least one processor is further configured to:
control the driver loaded into the memory of the embedded device to drive the component.

* * * * *